US012735131B2

(12) United States Patent
Beach et al.

(10) Patent No.: US 12,735,131 B2
(45) Date of Patent: Sep. 15, 2026

(54) APPARATUS AND METHODS FOR ASSEMBLING STRUCTURES

(71) Applicant: The Boeing Company, Arlington, VA (US)

(72) Inventors: Brent A. Beach, St. Louis, MO (US); Chester James Hill, IV, Grafton, IL (US); Jesse Daniel Tihen, St. Charles, MO (US); Gregg Joseph Zeisler, Jr., St Charles, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/959,462

(22) Filed: Nov. 25, 2024

(65) Prior Publication Data

US 2026/0145753 A1 May 28, 2026

(51) Int. Cl.
*B62D 65/02* (2006.01)
*B23P 19/10* (2006.01)

(52) U.S. Cl.
CPC ............ *B62D 65/026* (2013.01); *B23P 19/10* (2013.01)

(58) Field of Classification Search
CPC ............................... B62D 65/026; B23P 19/10
See application file for complete search history.

(56) References Cited

U.S. PATENT DOCUMENTS 2,567,124 A * 9/1951 Roberts ..................... B64C 3/18 244/124
4,356,616 A * 11/1982 Scott ....................... B64C 3/187 52/84
4,381,104 A * 4/1983 Nelsen .................... B25B 5/163 269/156
4,894,903 A * 1/1990 Woods ...................... B64F 5/10 29/559
5,033,178 A * 7/1991 Woods .................... B25B 11/00 29/243.57
5,050,288 A * 9/1991 Woods .................... B23P 19/00 408/1 R
5,249,785 A * 10/1993 Nelson .................. B25B 11/005 269/21
5,560,102 A 10/1996 Micale et al.
6,170,157 B1 1/2001 Munk et al.
6,314,630 B1 11/2001 Munk et al.
6,598,866 B2 * 7/2003 Helm .................... B25B 11/005 269/21
6,786,452 B2 * 9/2004 Yamashita ................ B64C 3/00 244/119
7,740,202 B2 * 6/2010 Namaizawa .............. B64C 3/18 244/131

(Continued)

*Primary Examiner* — Seahee Hong
(74) *Attorney, Agent, or Firm* — Hanley, Flight & Zimmerman, LLC

(57) ABSTRACT

Systems, apparatus, articles of manufacture, and methods to assemble structures are disclosed. An example apparatus includes a plate with a datum feature and a bracket coupled to the plate. The bracket includes an indexing feature, the indexing feature positioned and oriented relative to the datum feature, the indexing feature to receive and orient a coupling member of an assembly, and a first coupling feature disposed on the indexing feature, the first coupling feature to align with a second coupling feature disposed on the coupling member of the assembly when the indexing feature receives the coupling member.

20 Claims, 9 Drawing Sheets

(56) References Cited

U.S. PATENT DOCUMENTS

| | | | | |
|---|---|---|---|---|
| 8,418,960 | B2 * | 4/2013 | Moore | B64F 5/50 244/123.7 |
| 8,567,066 | B2 * | 10/2013 | Bestwick | B64C 3/187 408/72 R |
| 2015/0202824 | A1 * | 7/2015 | De Mattia | B29C 33/307 249/187.1 |

* cited by examiner 102
110
106
124
120
104
136
122
116
140
128
132
138
118
114
124
124
126
134
106
108
100
106
130
112
124
106
124
124
106

APPARATUS AND METHODS FOR ASSEMBLING STRUCTURES

FIELD

This disclosure relates generally to assembly and, more particularly, to apparatus and methods for assembling structures.

BACKGROUND

Structures such as machinery or vehicles are assembled from smaller components and subassemblies. Components and subassemblies are arranged and coupled together in the assembly process, often by aligning coupling features such as tabs or fastener holes. Expected variations and tolerances of each individual component can lead to difficulties aligning coupling features, especially when the variations and tolerances stack up over a long chain of components. In some structures, this tolerance stack up is accommodated through larger coupling features, such as slots or large fastener holes used with washers.

Large structures that prioritize lighter weight and stronger assemblies, such as aircraft, often include machine at assembly operations. In this way, coupling features such as fastener holes are modified or added to the assembly components after the components are placed in position. This reduces tolerance stack up without requiring individual assembly components to be manufactured with more accuracy and precision.

Some large structures are assembled with a process known as determinate assembly. In determinate assembly, components are designed and manufactured with intrinsic features, such as holes, that allow components of the assembly to self-locate relative to each other. In this way, the components determine assembly dimensions and contours rather than using conventional tooling to determine the placement of the parts relative to one another.

SUMMARY

An example apparatus disclosed herein includes a plate with a datum feature and a bracket coupled to the plate. The bracket includes an indexing feature, the indexing feature positioned and oriented relative to the datum feature, the indexing feature to receive and orient a coupling member of an assembly, and a first coupling feature disposed on the indexing feature, the first coupling feature to align with a second coupling feature disposed on the coupling member of the assembly when the indexing feature receives the coupling member.

An example method for assembling a jig for determinate assembly disclosed herein includes coupling a first determinate to a plate, the plate including a reference feature, fixturing the plate into a machining center, setting a zero point of the machining center based on the reference feature, machining the first determinate to duplicate a first end of a first connecting member of a subassembly, and coupling the plate to a stand.

An example method for assembling structures disclosed herein includes assembling a first subassembly, the first subassembly including a first attachment location on a first side of the first subassembly, coupling a first component of a second subassembly to a first replicator of a jig, the first replicator to replicate the first attachment location, coupling a second component of the second subassembly to the first component at a second attachment location of the first component, and coupling the second subassembly to the first subassembly at the first attachment location.

The features, functions, and advantages that have been discussed can be achieved independently in various embodiments or may be combined in yet other embodiments further details of which can be seen with reference to the following description and drawings.

BRIEF DESCRIPTION OF DRAWINGS

In general, the same reference numbers will be used throughout the drawing(s) and accompanying written description to refer to the same or like parts. The figures are not necessarily to scale.

DETAILED DESCRIPTION

Figure 1:
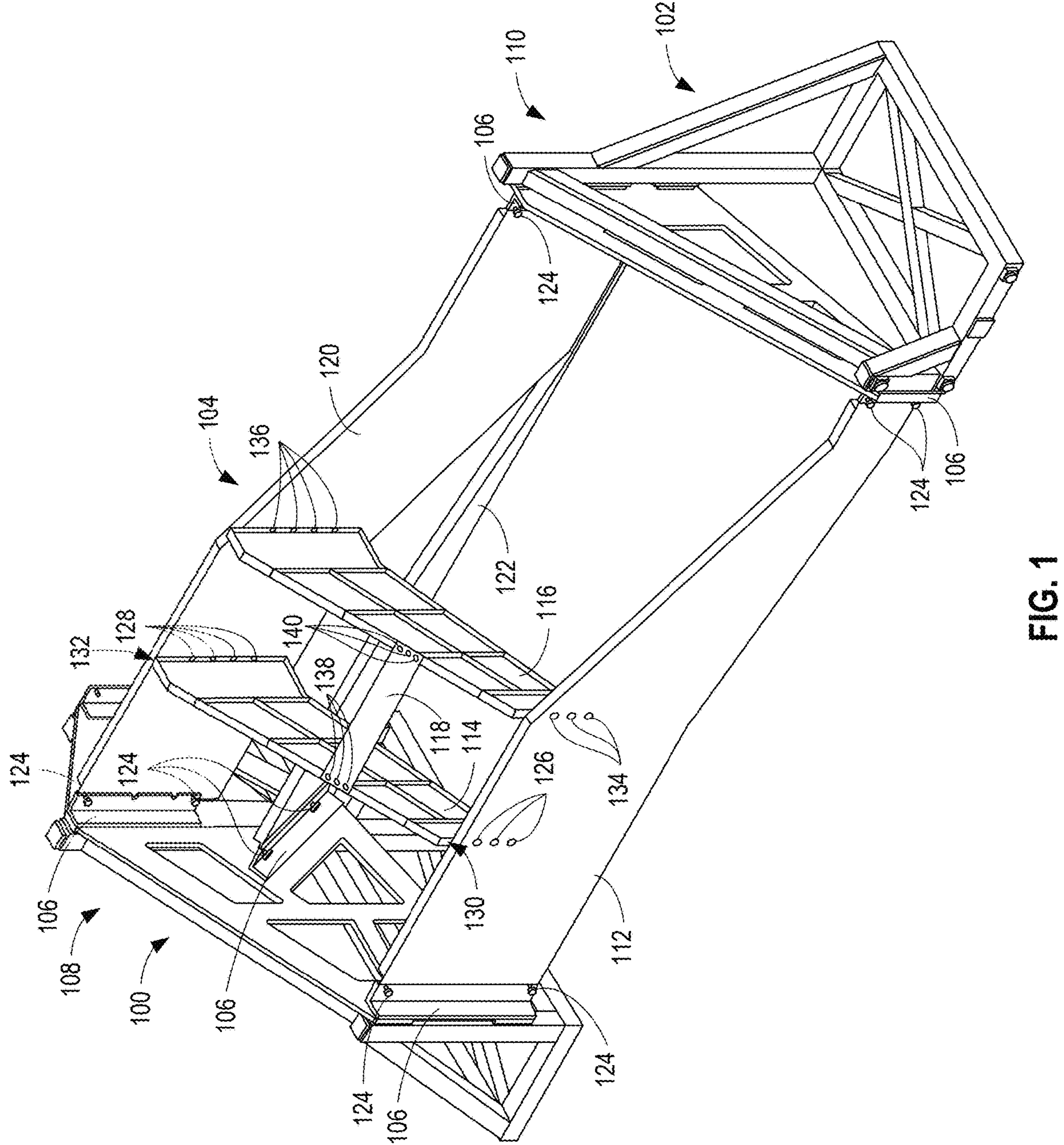
FIG. 1 illustrates example component replicator jigs being used to manufacture an example subassembly of an example structure.

Manufacturing and assembling large structures present a number of challenges for accuracy, precision, and speed of production. Large structures require a large manufacturing space for assembly and many different tools. For this reason, large structures are typically split into sections or subassemblies that can be assembled in parallel. This allows each individual subassembly to have a custom set of tooling to aid in manufacturing the subassembly. Each subassembly includes a number of components that are coupled together to form a completed subassembly. Completed subassemblies are then combined to form the full structure.

However, tolerance and alignment issues can arise as the size of components in an assembly increases, as is typical for a large structure. Small variations in positioning and orientation of large components can result in misalignment from one end of the structure to the next. Additionally, small variations in individual components can add up to large dimensional variation from one end of the structure to the next. For this reason, some known manufacturing techniques include adding joining features to (e.g., machining joining features into) components during the assembly process, which eliminates alignment and tolerance variation between the joining features. However, this process creates manufacturing debris and adds cost when compared to assembling completed parts with integrated joining features.

Determinate assembly is a known method of assembly that seeks to eliminate the issues with tolerance stack up, alignment, and machine at assembly joining. In determinate assembly, components are designed and manufactured with intrinsic features, such as holes or joining features, that allow components of the assembly to self-locate relative to each other. In this way, the determinate assembly process allows structures to be built up one component at a time without needing conventional tooling to determine the placement of the components relative to one another. The joining features are added to the components when the components are manufactured, thus eliminating the need to machine at assembly.

One issue with determinate assembly is tolerance stack up, particularly within structures with many components. Each component has an allowable tolerance (e.g., an acceptable manufacturing variation) that combines across the assembly or subassembly to potentially create a substantial dimensional deviation between opposite ends of the assembly. This deviation is particularly problematic when applied to subassemblies that must mate with other subassemblies, or where an overall shape of an assembly is critical, such as aerodynamic surfaces of an aircraft. In some instances, the variation prevents a joining operation between subassemblies, and the subassemblies must be reworked.

Apparatus and methods disclosed herein mitigate alignment issues when joining subassemblies. Apparatus and methods disclosed herein replicate the joining features of surrounding subassemblies to serve as assembly jigs for a subassembly. By recreating the shape and relative position of components that the subassembly will later be joined to, apparatus and methods disclosed herein provide the components of the subassembly with the proper alignment as the subassembly is being assembled. Thus, any tolerance stack ups or variation within parts do not reach the components that will later couple to a different subassembly. In other words, apparatus and methods disclosed herein establish the nominal positions of the coupling components of a subassembly, regardless of part to part variation.

FIG. 1 illustrates example component replicator jigs 100 and 102 being used to manufacture an example subassembly 104 of an example structure. The structure in FIG. 1 is a generic structure for illustration purposes, but the component replicator jigs 100 and 102 can be used to assemble any structure or vehicle that requires repeated assembly of components or subassemblies. The component replicator jigs 100 and 102 include example replicators 106 (further detailed below in relation to FIGS. 3A-3D) that replicate (e.g., duplicate, copy, etc.) coupling members (e.g., joining members, attachment locations, etc.) of subassemblies (e.g., major assembly components) that neighbor the subassembly 104. In other words, the subassembly 104 is a portion of a complete final assembly that will later be coupled (e.g., joined) to other subassemblies at an example first side 108 of the subassembly 104 and an example second side 110 of the subassembly 104. Rather than using known tooling (e.g., fixtures, jigs, etc.) to hold the subassembly 104 for assembly, the component replicator jigs 100,102 support the subassembly 104 in the same way that the subassembly 104 would be supported in the final assembly by the subassemblies on the first side 108 and the second side 110.

The first side 108 of the subassembly 104 of FIG. 1 is shown opposite and approximately parallel to the second side 110 of the subassembly 104. In some examples, the first side 108 and the second side 110 of the subassembly 104 are not parallel. In other examples, the subassembly 104 can have any complex (e.g., curved, twisted, asymmetric, etc.) shape and can connect to other subassemblies at any location within the subassembly 104. Accordingly, the first side 108 and the second side 110, and correspondingly the component replicator jigs 100 and 102, can be located and oriented around the subassembly 104 in any manner to match how the subassembly 104 couples to the neighboring subassemblies to form the final assembly.

The component replicator jigs 100 and 102 of FIG. 1 are spaced apart and oriented relative one another to match the nominal positions of the first side 108 and the second side 110 of the subassembly 104. The nominal positions represent the positions of the subassembly 104, the positions of neighboring (e.g., adjacent) subassemblies, and the positions of the various connecting members as designed in the final assembly. Components have acceptable variation and manufacturing tolerances, which allows key features of the components to deviate from the nominal sizes and/or the nominal positions of the features. The component replicator jigs 100,102 are accurately shaped and positioned to precisely hold the first side 108 and the second side 110 of the subassembly 104 at their respective nominal positions. In this way, component variation does not accumulate from the first side 108 to the second side 110 in a way that causes either the first side 108 or the second side 110 to unacceptably deviate from their nominal position. Rather, any component variation that occurs is accommodated or adjusted for within the subassembly 104 in a way that maintains the coupling locations at the first side 108 and the second side 110. For example, if multiple components are acceptably oversized from nominal, coupling those components end to end without the component replicator jigs 100 and 102 could result in the subassembly 104 having an overall length that is unacceptably long. If the same oversized components are coupled end to end with the component replicator jigs 100 and 102, some components would be, for example, coupled closer together to accommodate the component variation while preserving the overall length of subassembly 104. The accommodations between components can be slight positioning, angling, or orientation changes that fall within acceptable assembly deviations within the subassembly 104. In this way, the component replicator jigs 100 and 102 prevent tolerance stack up issues from negatively affecting subassembly to subassembly coupling.

The subassembly 104 of FIG. 1 includes example components 112, 114, 116, 118, 120, and 122. In some examples, the subassembly 104 is a torque box to provide strength and structure to the final assembly. In other examples, the subassembly 104 can be a different structure with a different number of components. The components 112, 120, and 122 of FIG. 1 are temporarily (e.g., removably) coupled to the component replicator jig 100 and the component replicator jig 102 by example temporary fasteners 124 (e.g., screws, bolts, pins, clamps, etc.). The components 112, 120, and 122 include joining features (e.g., coupling features, fastener holes, tabs, slots, etc.) at the first side 108 and the second side 110 that were added when the components 112, 120, and 122 were manufactured. The replicators 106 include corresponding joining features to allow the components 112, 120, and 122 to couple to the replicators 106. In this way, the replicators 106 receive and orient the components 112, 120, and 122. Once the components 112, 120, and 122 are coupled to the component replicator jigs 100 and 102, the components 112, 120, and 122 serve as supports for additional components of the subassembly 104 to be added.

In addition to preserving the nominal positions of the connecting members of the subassembly 104 and the surrounding subassemblies, the replicators 106 of FIG. 1 act as indexing features for further assembly of the components of subassembly 104. For example, the components 114, 116, and 118 are coupled to the subassembly 104 at specific locations relative to one or more of the replicators 106. In some examples, the components 114, 116, and 118 are indexed from (e.g., positioned relative to) the replicators 106 at precise locations by assembly equipment. In other examples, the replicators 106 index the coupling features of the components 112, 120, 122 via coupling to the components 112, 120, 122. For example, the component 112 includes example joining features 126 that have been machined or otherwise added to the component 112 during manufacture. The joining features 126 have a nominal location on the component 112. Similarly, the component 120 includes example joining features 128 that are machined into the component 120 at a nominal location. Coupling the components 112 and 120 to the replicators 106 positions and orients the joining features 126 relative to the joining features 128. In this way, the replicators 106 index the joining features 126 and 128 to a nominal position in the subassembly 104. Thus, the component 114 can be indexed (e.g., positioned) to align with the joining features 126 and 128. In other words, the component 114 is aligned to the joining features 126 on a first end 130 and aligned to the joining features 128 on a second end 132. As the joining features 126 and 128 are indexed to nominal positions of the subassembly 104 by the replicators 106, the joining features 126 are positioned and oriented relative the joining features 128 equivalently to the corresponding joining features on the first end 130 and the second end 132 of the component 114. Thus, the component 114 can be coupled to the component 112 and the component 120 without extra adjustment, shimming, or machining. Similarly, the component 116 is coupled to the component 112 at example joining features 134 and coupled to the component 120 at example joining features 136.

The component replicator jigs 100,102 of FIG. 1 facilitate determinate assembly of the subassembly 104. The replicators 106 of the component replicator jigs 100,102 align and orient the components of subassembly 104 so that positions of various determinates of the components are acceptably close to (e.g., within a threshold tolerance of) the corresponding nominal positions in the final assembly. As described above, the joining features 126, 128, 134, and 136 are determinants that align other components such as the components 114 and 116. Additionally, the component 114 is coupled to the component 116 via the components 118 and 122. Whereas the component 122 is positioned (e.g., indexed) by the replicators 106, the component 118 relies on the components 114 and 116 for positioning. Excessive variation (e.g., beyond a threshold variation, variation out of tolerance, etc.) in the positioning and orientation of the components 114 and 116 can cause alignment issues with the component 118 during assembly.

Example joining features 138 and 140 of the component 118 may not match (e.g., align with) corresponding joining features of the components 114 and 116 if the position and orientation of the components 114 and 116 are incorrect (e.g., out of tolerance). In other words, tolerance stack up is particularly concerning when components are coupled to multiple other components within a subassembly even when using determinate assembly to align components relative to one another.

The component 122 of FIG. 1 couples to the components 114 and 116 at an oblique angle (e.g., not parallel or perpendicular) relative to the joining features 126, 128, 134, and 136. In known assembly methods, additional tooling (e.g., fixturing) and inspection would be required to ensure that the proper alignment between the components 122, 114, and 116 is maintained. Without proper alignment, stresses would build up in the components 114, 116, and 122 that could damage the components or cause the subassembly 104 to warp out of shape once removed from the tooling. Known methods of maintaining alignment require expensive fixtures that must be precisely located as well as repeated precision inspections during the assembly process. These known methods can be less accommodating for component variation, which requires tighter tolerances and higher costs in components. However, the component replicator jigs 100,102 improve alignment for all the components to reduce joining stresses and lower the risk of warping of the subassembly 104. The component replicator jigs 100,102 are also more accommodating for component variation, as the higher accuracy requirements are limited to the first side 108 and the second side 110 of the subassembly 104.

Figure 2:
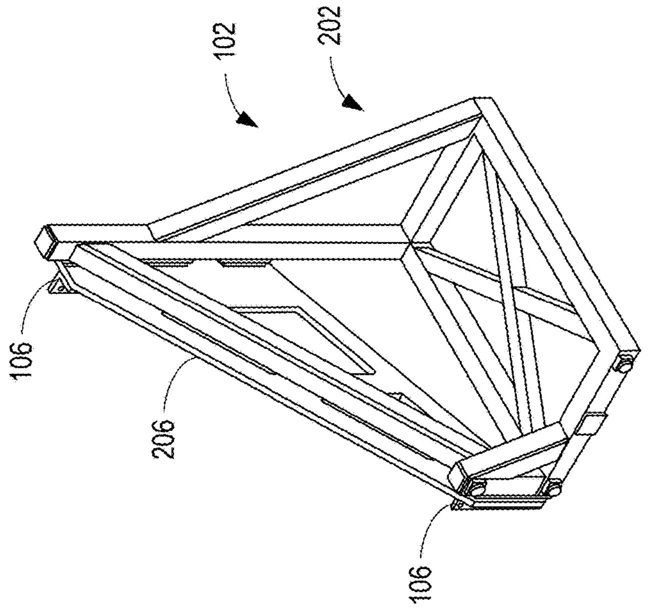
FIG. 2 illustrates the example component replicator jigs of FIG. 1 with the subassembly removed.
Figure 2:
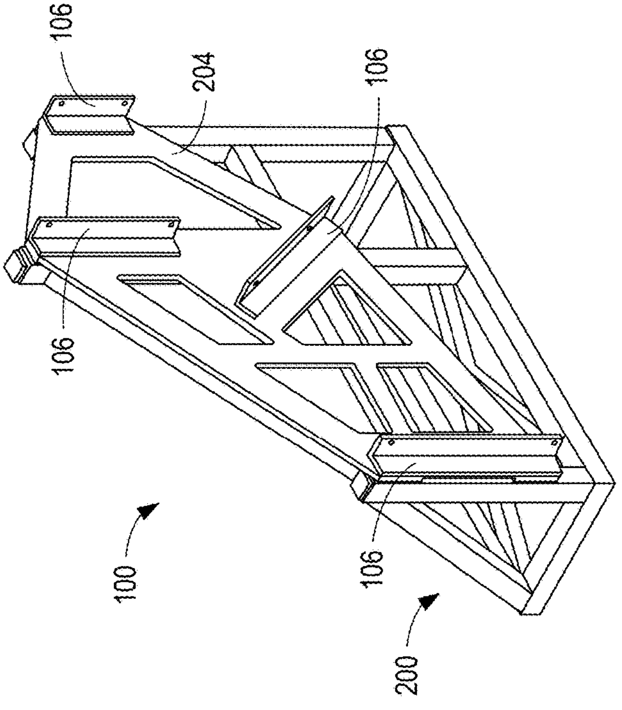

FIG. 2 illustrates the example component replicator jigs 100 and 102 of FIG. 1 with the subassembly 104 removed. The component replicator jigs 100 and 102 include example stands 200 and 202 (e.g., supports, trusses, bases, frames, etc.) that support example plates 204 and 206 (e.g., plate members, bodies, tables, etc.). As discussed in more detail below in reference to FIGS. 3A-4, the plates 204 and 206 support and position the replicators 106. In other words, the plates 204 and 206 are temporary substitutes for the subassemblies to which the subassembly 104 will couple. The stands 200 and 202 are sized and shaped to hold the plates 204 and 206. In other examples the stands 200 and 202 can have a different size and shape as required to support the subassembly 104 (not shown) and to replicate the joining features of the subassemblies surrounding the subassembly 104. The stands 200 and 202 are secured to the ground or otherwise fixed in place to support the weight of the subassembly 104 and to maintain the proper spacing and orientation. In other words, the stands 200 and 202 are positioned and fixed relative to one another such that the replicators 106 stay in the correct nominal position and orientation to couple to the subassembly 104 in the same way that the subassembly 104 would be coupled to the larger full assembly.

FIGS. 3A-3D illustrate the example component replicator jigs 100 and 102 of FIG. 1 including the example stands 200,202, example plates 204 and 206, and example replicators 106. The example replicators 106 are coupled to the example plates 204 and 206. In some examples, the replicators 106 are brackets with example flanges 300 that extend away from the plates 204 and 206. In other examples, the replicators 106 have a different shape that couples to the plates 204 and 206 and supports the subassembly 104 (not shown). While the replicators 106 are designed to duplicate connecting members of subassemblies, the replicators 106 can copy the key features of the connecting members without copying the overall shape. Similarly, the plates 204 and 206 are shaped to hold the replicators 106. In some examples the plates 204 and 206 are shaped similarly to structural members (e.g., bulkheads) of the neighboring subassembly. In other examples, the plates 204 and 206 are curved to support round or cylindrical subassemblies. In some examples, the plates 204 and 206 have different shapes to facilitate coupling to the stands 200 and 202. The plates 204 and 206 of FIGS. 3A-3D include example openings 302 to suit various needs of the assembly process. In some examples, the openings 302 are added to the plates 204 and 206 to decrease a total weight of the plates 204 and 206. In other examples, the openings 302 are added to allow components (e.g., cables, wires, hoses, etc.) of the subassembly 104 to pass through the plates during assembly. In other examples, the plates 204 and 206 have no openings 302.

The plates 204 and 206 also serve as datums (e.g., reference points) for the replicators 106. The replicators 106 are precisely arranged relative to each other to duplicate (e.g., replicate) all of the connecting members of the neighboring subassemblies. Thus, the plates 204 and 206 are used to ensure the specific interrelationship of the replicators 106. Each of the replicators 106 can have a different size, shape, and/or orientation based on the connecting members of the subassembly being duplicated. The replicators 106 include example indexing features 304. The indexing features 304 are features (e.g., surfaces, tabs, contours, etc.) that directly interface with components of subassembly 104 (not shown). In this way, the indexing features 304 position the components of the subassembly 104 in their respective nominal positions. Therefore, the indexing features 304 are the functional areas of the replicators 106.

Figure 3A:
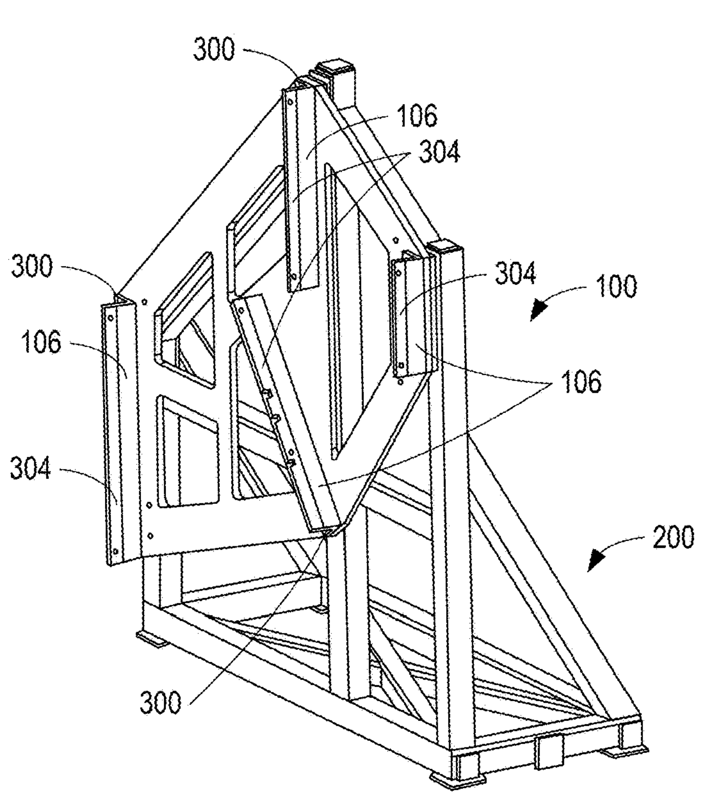
FIGS. 3A-3D illustrate the example component replicator jigs of FIG. 1 including example stands, example plates, and example component replicators.
Figure 3B:
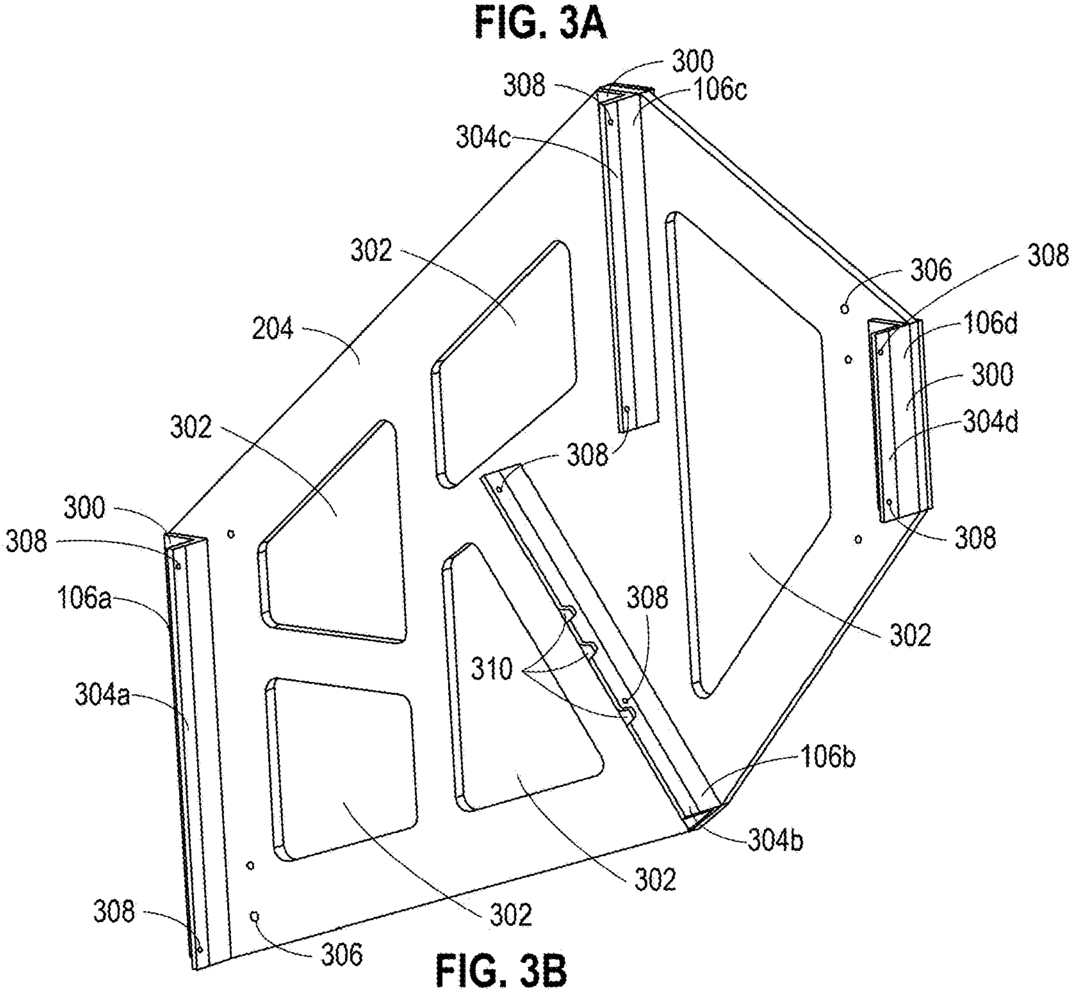
Figure 3C:
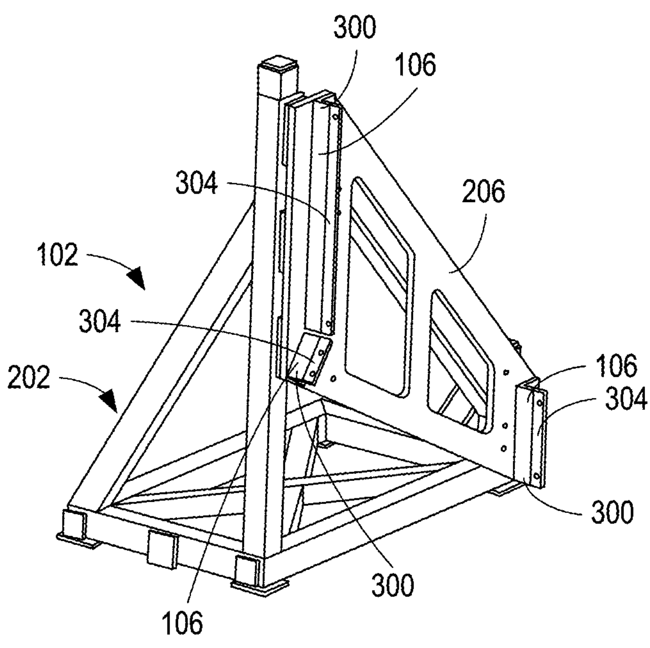

Turning to FIG. 3B, example replicators 106*a*, 106*b*, 106*c*, and 106*d* include respective example indexing features 304*a*, 304*b*, 304*c*, and 304*d*. The indexing features 304*a*, 304*b*, 304*c*, and 304*d* are positioned and oriented relative to one another to a high degree of accuracy (e.g., within 0.005", within 0.002", within 0.001", etc.). By maintaining a high degree of accuracy, the indexing features 304*a*, 304*b*, 304*c*, and 304*d* accurately maintain the nominal positions of the connecting members of the subassembly 104 (not shown). In some examples, the indexing features 304*a*, 304*b*, 304*c*, and 304*d* are machined at the same time on a machining center (e.g., a milling machine, an electric discharge machining machine, etc.). The plate 204 includes example datum features 306 that are used by the machining center to determine the orientation of the plate 204 and the nominal positions of the replicators 106*a*, 106*b*, 106*c*, and 106*d*. The machining center then machines the replicators 106*a*, 106*b*, 106*c*, and 106*d* to remove material and generate the indexing features 304*a*, 304*b*, 304*c*, and 304*d*. In this way, the indexing features 304*a*, 304*b*, 304*c*, and 304*d* are accurately positioned and oriented relative to each other and the datum features 306. In other examples, the indexing features 304*a*, 304*b*, 304*c*, and 304*d* are machined on the replicators 106*a*, 106*b*, 106*c*, and 106*d* separately, and the replicators 106*a*, 106*b*, 106*c*, and 106*d* are oriented and coupled to the plate 204 relative to the datum features 306.

The indexing features 304*a*, 304*b*, 304*c*, and 304*d* of FIG. 3B have different sizes and orientations relative to one another. Each indexing feature 304*a*, 304*b*, 304*c*, and 304*d* includes one or more example joining features 308 (e.g., fastener holes, slots, tabs, etc.). The joining features 308 are sized and positioned to match the joining features of the components (e.g., the components 112, 120, and 122 of subassembly 104). In some examples, indexing features, such as the indexing feature 304*b*, include example notches 310. The notches 310 are shapes or grooves that can be used as joining features and/or openings to allow components (e.g., cables, wires, etc.) to be routed through the subassembly 104.

Figure 3D:
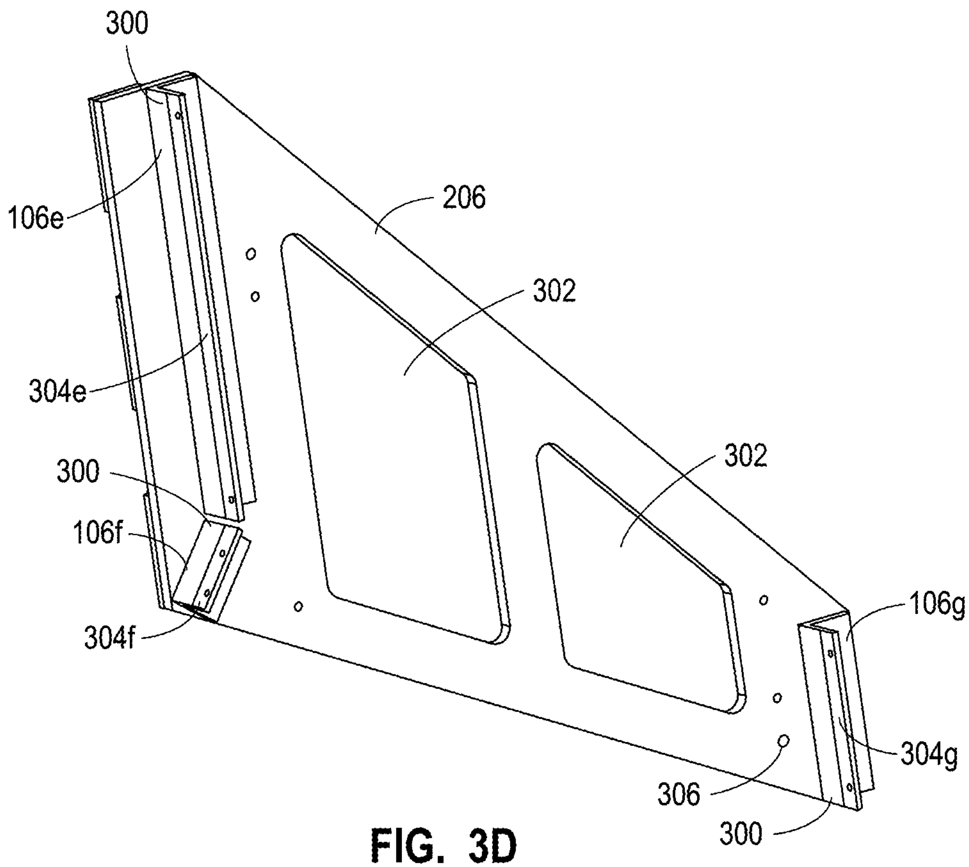

FIG. 3D illustrates the plate 206 of FIG. 2 with example replicators 106*e*, 106*f*, and 106*g*. Each replicator 106*e*, 106*f*, and 106*g* includes an example indexing feature 304*e*, 304*f*, 304*g*. The indexing features 304*e*, 304*f*, 304*g* are oriented relative to example datum features 306. Thus, the replicators 106*e*, 106*f*, and 106*g* are similarly oriented relative to the datum features 306. Comparing the plate 206 of FIG. 3D to the plate 204 of FIG. 3B, the plate 204 includes more replicators 106 than the plate 206. The replicators 106*a*, 106*b*, 106*c*, and 106*d* of FIG. 3B differ in shape and orientation compared to the replicators 106*e*, 106*f*, and 106*g*. Thus, the plate 206 of FIG. 3D and the plate 204 of FIG. 3B need not be similar in size and shape to support the subassembly 104 (not shown), the plates 204 and 206 can have any size and shape as required to replicate (e.g., duplicate, mirror, etc.) the joining members of neighboring assemblies.

Figure 4:
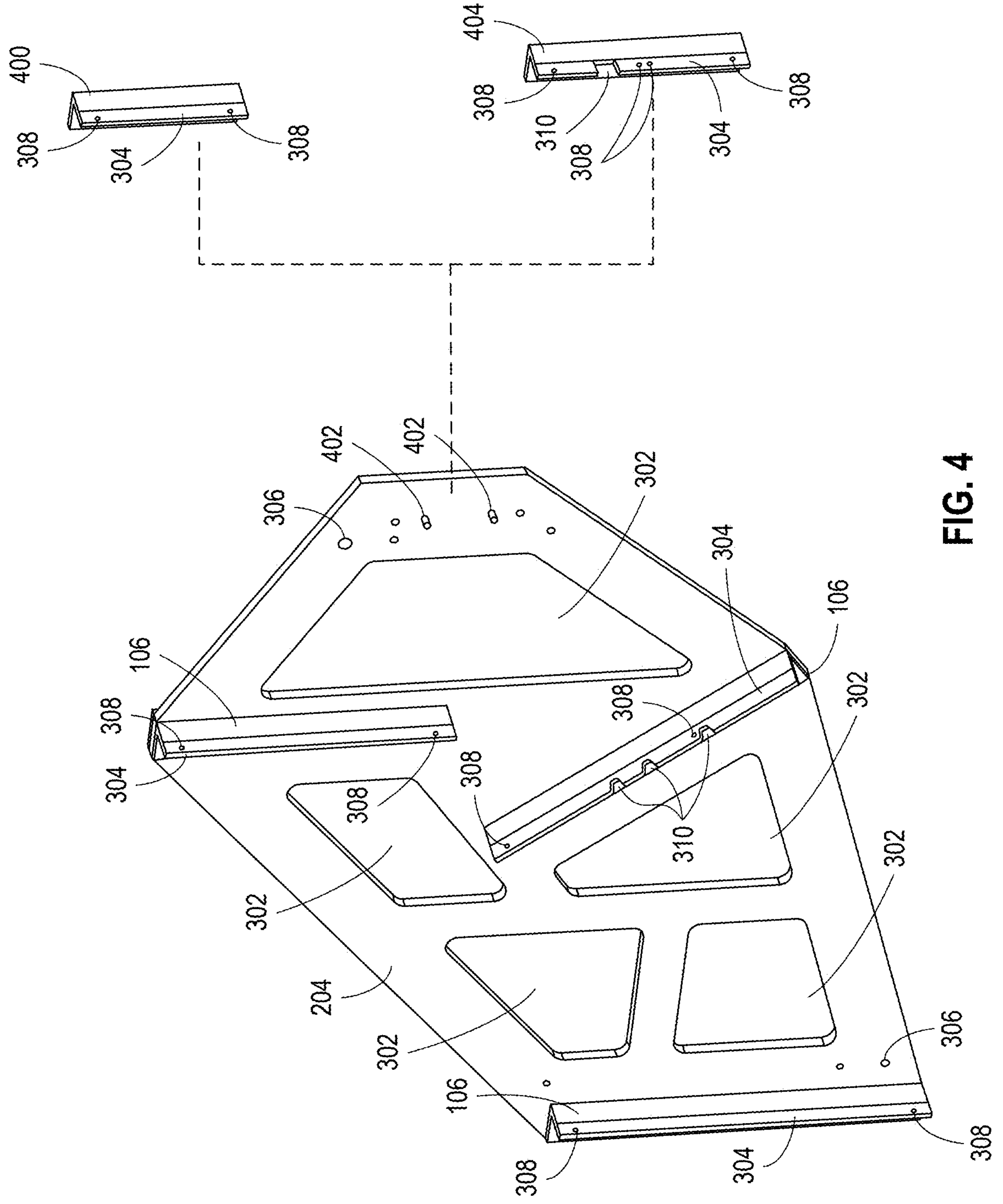
FIG. 4 illustrates the example plate of FIGS. 3A and 3B with an example removable replicator.

FIG. 4 illustrates the example plate 204 of FIGS. 3A and 3B with an example removable replicator 400. The removable replicator 400 is removably coupled to the plate 204. In some examples, the removable replicator 400 is coupled to the plate with example pins 402. The pins 402 engage the removable replicator 400 such that the replicator maintains an orientation when it is recoupled to the plate 204. In this way, the relative position of the removable replicator 400 is maintained through repeated coupling and decoupling. Thus, the orientation of the removable replicator 400 relative to the datum features 306, and consequently to the replicators 106 and the plate 204, is maintained.

The removable replicator 400 of FIG. 4 can be decoupled from and recoupled to the plate 204 without losing the orientation of the removable replicator 400. This allows the removable replicator to be modified or replaced while maintaining the orientation of the removable replicator 400. In some examples, the removable replicator 400 can be removed and machined to alter the indexing feature 304. In other examples, the removable replicator 400 is replaced by an example removable replicator 404. The removable replicator 404 interfaces with the pins 402 to maintain the orientation of removable replicator 400. In some examples, the removable replicator 404 includes a different number of example joining features 308 and or example notches 310 compared to the removable replicator 400. In some examples, the removable replicator 404 is a different size and/or shape than the removable replicator 400. In other examples, the removable replicator 404 is a copy of the removable replicator 400.

The removable replicator 400 of FIG. 4 allows the removable replicator 400 to be replaced or modified. This allows the removable replicator 400 to be changed in response to design changes of the subassembly 104 (not shown). If the design of the subassembly 104 and/or the neighboring subassembly changes, the joining members of the subassembly 104 and/or the neighboring subassembly can change as well. By removably coupling the removable replicator 400 to the plate 204, the removable replicator 400 can be modified without requiring new or modified replicators 106. In this way, the plate 204 and unchanged replicators 106 can be reused to support a changed subassembly 104 and/or neighboring assembly. This saves materials and costs associated with design changes. In some examples, any number of replicators 106 of the plate 204 can be removable replicators.

Figure 5:
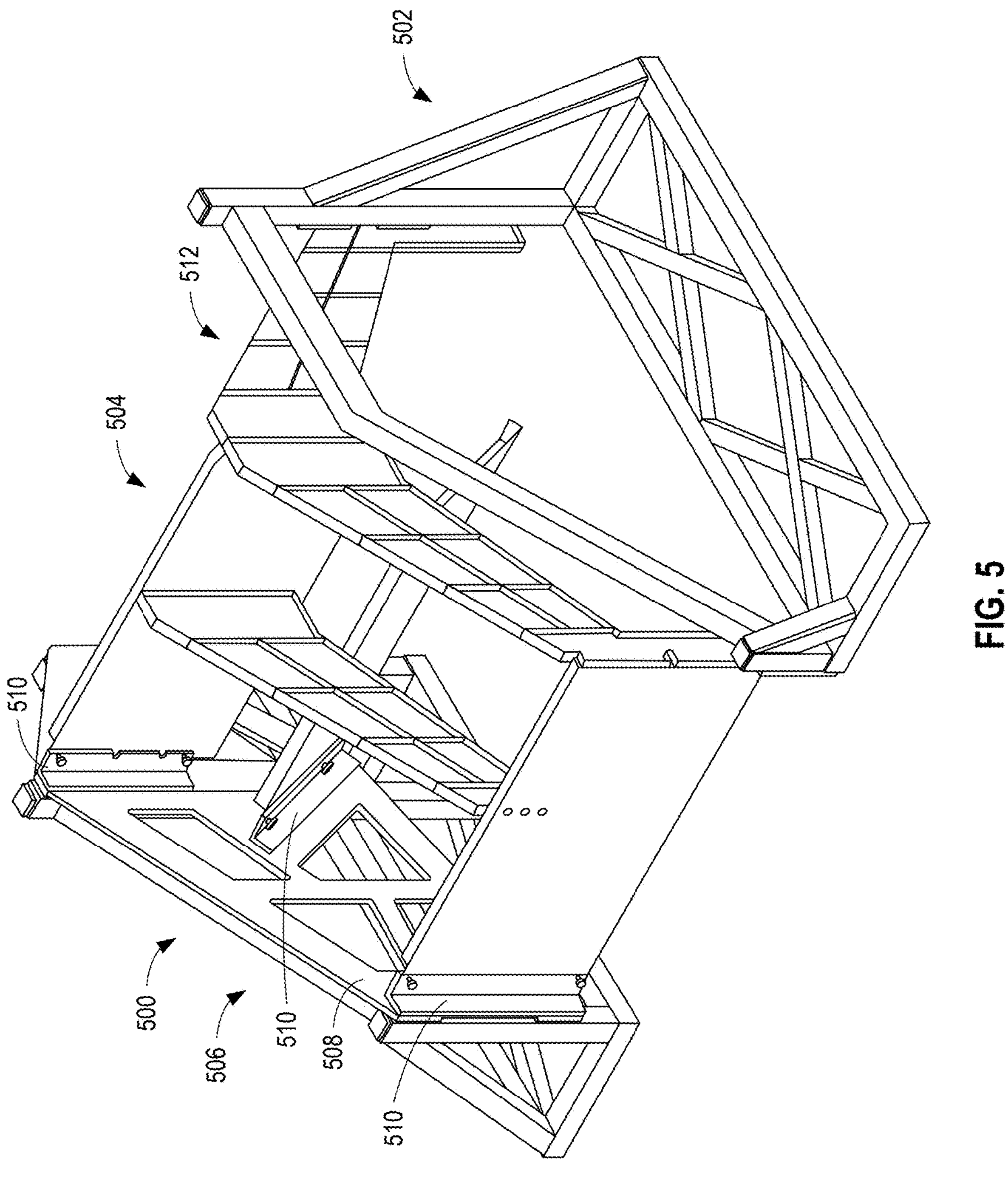
FIG. 5 illustrates an example component replicator jig used with traditional tooling to manufacture an example subassembly of an example structure.

FIG. 5 illustrates an example component replicator jig 500 used with example traditional tooling 502 to manufacture an example subassembly 504 of an example structure. In this example, the subassembly 504 is representative of an end of the full assembly. Thus, the first side 506 of the subassembly 504 is coupled to the component replicator jig 500. The component replicator jig 500 includes an example plate 508 and example replicators 510 to duplicate the joining members of a neighboring assembly.

However, on the second side 512, opposite the first side 506, there is no neighboring subassembly. Instead, the subassembly 504 coincides with an end of the larger full assembly. As such, the traditional tooling 502 supports the second side 512 during assembly of the subassembly 504. In other examples, the second side 512 of the subassembly 504 does couple to a neighboring assembly, but the coupling method is simple or does not require multiple components to be aligned.

Figure 6:
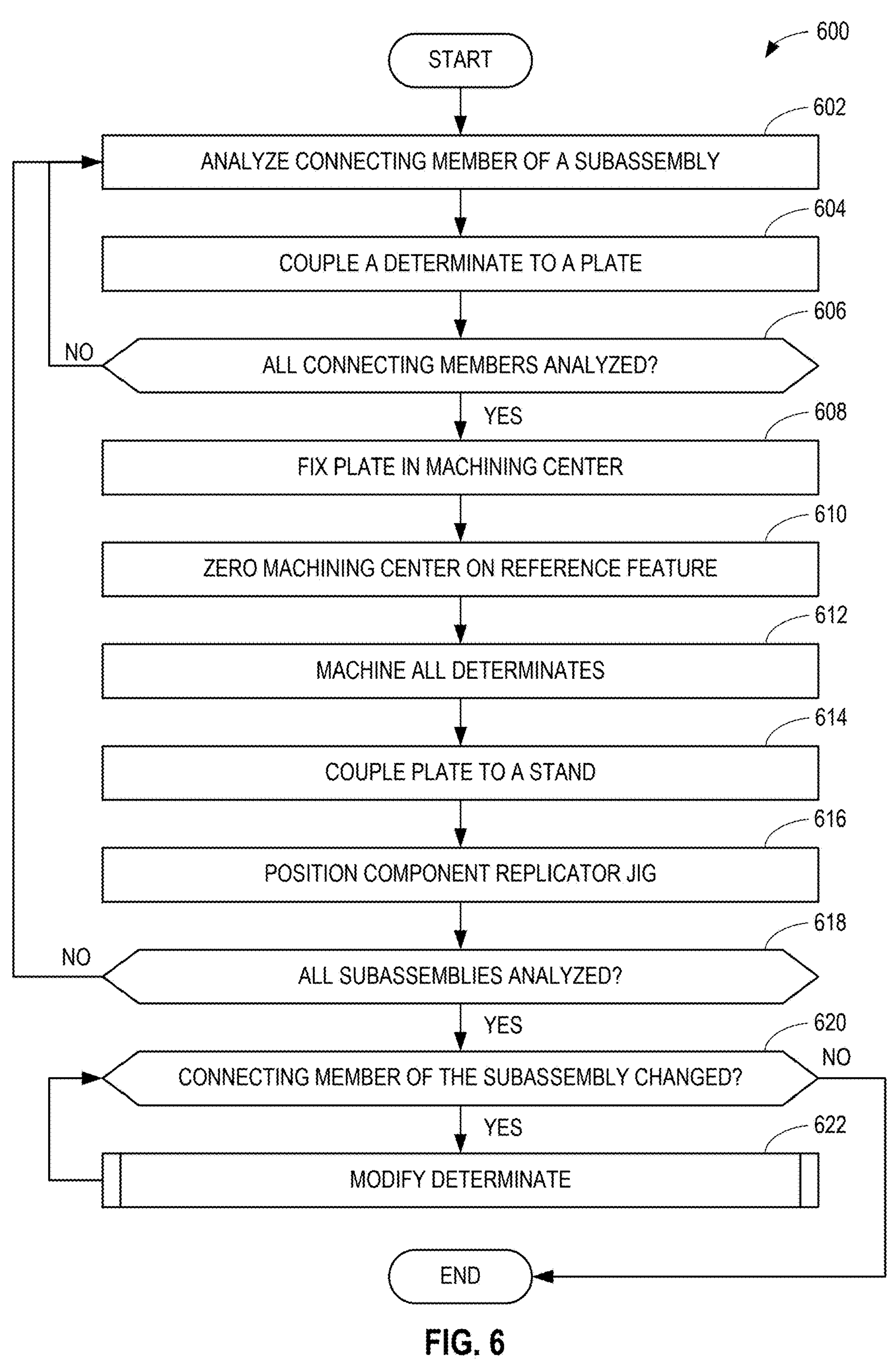
FIG. 6 is a flowchart representative of an example method of manufacturing example component replicator jigs.

FIG. 6 is a flowchart representative of an example method 600 of manufacturing example component replicator jigs. The method 600 begins at block 602 where a connecting member of a subassembly is analyzed. The connecting member is analyzed for a size, a shape, and an orientation of key connecting features at an end of the connecting member. The method 600 continues to block 604, where a determinate (e.g., the replicator 106*a* of FIG. 3B) is coupled to a plate (e.g., the plate 204 of FIG. 3B). The determinate is approximately the same size and shape as the end of the connecting member. The plate supports the determinate and includes at least one reference feature (e.g., the datum features 306 of FIG. 3B). The method 600 continues to block 606, where it is determined if all connecting members of the subassembly have been analyzed. If not all connecting members of the subassembly have been analyzed, the method 600 moves to block 602, where a different connecting member is analyzed. If more than one connecting member is present in the subassembly, the connecting member is further analyzed for the relative position and orientation of the connecting member relative to the other connecting member(s). The method 600 continues to block 604, where a different determinate (e.g., the replicator 106*b* of FIG. 3B) is coupled to the plate at the relative position and orientation. The method 600 continues to block 606. If all connecting members of the subassembly have been analyzed the method 600 continues to block 608.

At block 608 of the method 600 of FIG. 6, the plate is fixed into a machining center via one or more fixtures. The machining center includes tooling to remove material from the determinates, as well as tools to probe the location of the plate within the machining center. The method 600 continues to block 610, where the machining center is zeroed (e.g., a zero point is set, a reference frame is defined, etc.) on the reference feature. The plate (e.g., the plate 204 of FIG. 3B) includes at least one reference feature (e.g., the datum features 306 of FIG. 3B) that is used to zero the machining center. The machining center probes or otherwise determines the location of the reference feature relative to the one or more fixtures of the machining center. In some examples, the machining center determines an orientation of the plate based on an orientation of the reference feature. In other examples, the plate includes two or more reference features, and the machining center determines the orientation of the plate based on the positions of the two or more reference features. The method 600 continues to block 612, where all determinates on the plate are machined. The determinates are machined to duplicate the respective ends of the corresponding connecting members that were analyzed to place the determinates in block 602. In this way, the determinates are changed from approximately the same orientation and shape of the respective ends of the corresponding connecting members to substantially the same orientation and shape (e.g., within a threshold tolerance of the nominal shape and orientation) of the respective ends of the corresponding connecting members. In other words, the machining center removes material from the determinates to create example indexing features (e.g., the indexing feature 304*a* of FIG. 3B) and joining features (e.g., joining features 308 of FIG. 3B).

Once all determinates are machined, the method 600 of FIG. 6 continues to block 614, where the plate is coupled to a stand (e.g., the stand 200 of FIG. 3A). The plate is removed from the machining center and coupled to stand at a specific orientation. Once the plate is coupled to the stand, an example component replicator jig (e.g., the component replicator jig 100 of FIG. 3A) has been assembled. The method 600 continues to block 616, where the component replicator jig is positioned. In some examples, the component replicator jig is positioned in a manufacturing location to be used to assemble an example subassembly.

The method 600 of FIG. 6 continues to block 618, where it is determined if all subassemblies are analyzed. In some examples, the subassembly to be assembled (e.g., subassembly 104 of FIG. 1) is connected to more than one subassembly. In this case, an example second subassembly connected to the subassembly to be assembled has not yet been analyzed, and the method 600 moves to block 602 to analyze an example connecting member of the second subassembly. The method 600 continues between blocks 602, 604, and 606 until all connecting members of the second subassembly have been analyzed and corresponding second determinates (e.g., the replicator 106*e* of FIG. 3D) have been coupled to an example second plate (e.g., the plate 206 of FIG. 3D). The method 600 continues to blocks 608, 610, and 612 to machine determinates to their final shape and orientation (e.g., machining the indexing feature 304*e* into the replicator 106*e* of FIG. 3D). The method 600 continues to block 614, where the second plate is coupled to an example second stand (e.g., the stand 202 of FIG. 3C) to form a second component replicator jig (e.g., the component replicator jig 102). The second plate is coupled to the second stand such that the second determinates of the second replicator jig have an orientation relative to the determinates of the first replicator jig equivalent to an orientation of the first subassembly relative to the second subassembly, when the first subassembly is coupled the second subassembly via the subassembly to be assembled. In other words, the second plate is coupled to the second stand in an orientation that enables a component of the subassembly to be assembled to couple to both component replicator jigs. The method 600 continues to block 616, where the second component replicator jig is positioned. The second component replicator jig is positioned relative to the first replicator jig such that the position and orientation of the second determinates relative to the first determinates is equivalent to the position and orientation of the ends of the second connecting members relative to the ends of the first connecting members when the second subassembly is coupled to the first subassembly via the subassembly to be assembled.

Returning to block 618 of the method 600 of FIG. 6, if all subassemblies have been analyzed, the method 600 continues to block 620. At block 620, it is determined if a connecting member of a subassembly has been changed. If no connecting member of a subassembly has been changed, the method 600 ends. If a connecting member of a subassembly has changed (e.g., has a modified shape), the method 600 continues to block 622, where a determinate is modified. Connecting members of subassemblies can change due to a design change of the final assembly. To maintain the appropriate determinates equivalent to the connecting members, the determinates are modified or replaced, as described in more detail below in relation to the flowchart of FIG. 7.

Figure 7:
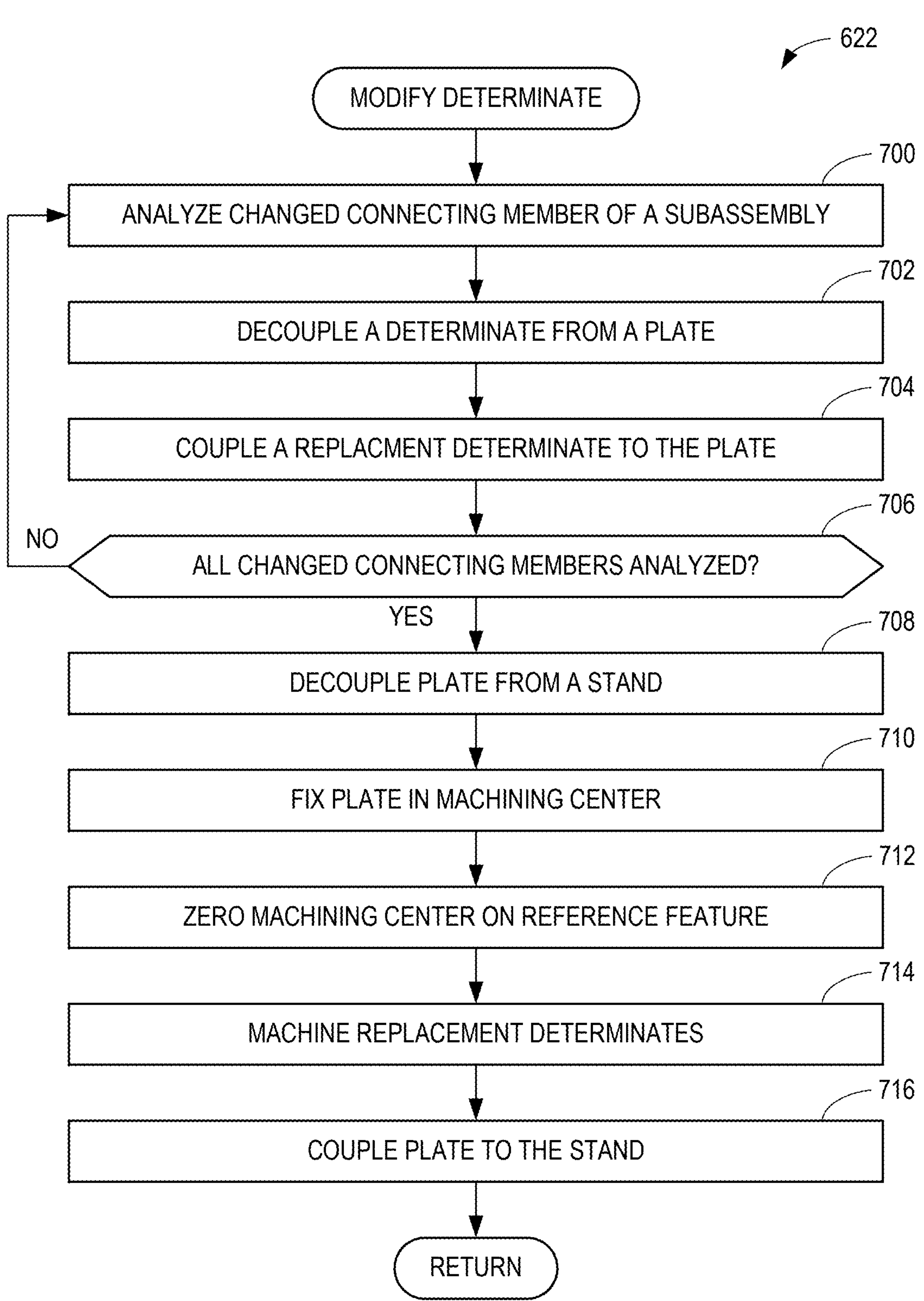
FIG. 7 is a flowchart representative of an example method of modifying determinates.

FIG. 7 is a flowchart representative of an example method 622 of modifying determinates. The method 622 begins at block 700, where a changed connecting member of a subassembly is analyzed. The changed connecting member is analyzed for a size, a shape, and an orientation of key connecting features at an end of the changed connecting member. The method 622 continues to block 702, where a determinate (e.g., the removable replicator 400 of FIG. 4) is decoupled from a plate (e.g., the plate 204 of FIG. 4). The determinate corresponds to the previous connecting member that had been changed and, thus, no longer corresponds to the changed connecting member. The method 622 continues to block 704, where a replacement determinate (e.g., the removable replicator 404 of FIG. 4) is coupled to the plate. The method 622 continues to block 706, where it is determined if all changed connecting members of the subassembly have been analyzed. If not all connecting members of the subassembly have been analyzed, the method 622 moves to block 700, where a different changed connecting member is analyzed. The method 622 continues to block 702, where a second determinate is decoupled from the plate. The method 622 continues to block 704, where a second replacement determinate is coupled to the plate. The method 622 continues to block 606. If all connecting members of the subassembly have been analyzed the method 622 continues to block 708.

At block 708 of the method 622 of FIG. 7, the plate (e.g., plate 204 of FIG. 4) is decoupled from a stand (e.g., the stand 200 of FIG. 2). The method 622 continues to block 710, where the plate is fixed into a machining center via one or more fixtures. The machining center includes tooling to remove material from the determinates, as well as tools to probe the location of the plate within the machining center. The method 622 continues to block 712, where the machining center is zeroed on a reference feature (e.g., the datum features 306 of FIG. 4). In this way, the orientation and position of the plate is determined by the machining center. The method 622 continues to block 714, where all replacement determinates on the plate are machined. Thus, the replacement determinates and the corresponding replacement indexing features are positioned and oriented relative to the reference feature of the plate to maintain a position and orientation of the replacement determinates relative to the unchanged determinates. The method 622 continues to block 716, where the plate is coupled to the stand and the method 622 ends.

Figure 8:
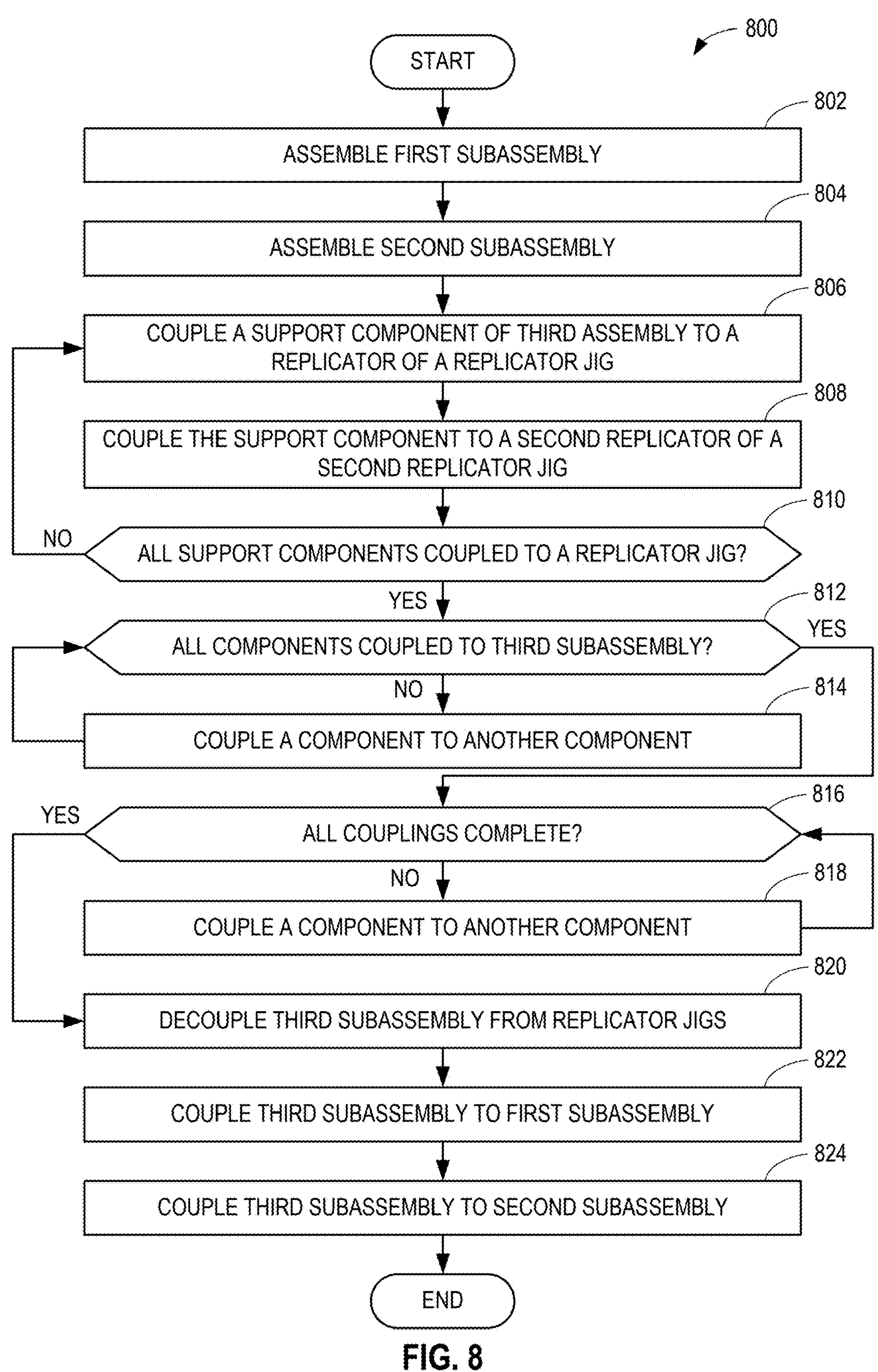
FIG. 8 is a flowchart representative of an example method of manufacturing structures.

FIG. 8 is a flowchart representative of an example method 800 of manufacturing structures. The method 800 begins at block 802, where a first subassembly is assembled. The method 800 continues to block 804, where a second subassembly is assembled. The first subassembly and the second subassembly represent sections of a structure to be manufactured. The first subassembly and the second subassembly are connected to a third subassembly to be assembled (e.g., the subassembly 104 of FIG. 1). In this way the first subassembly (e.g., the subassembly on the first side 108 of FIG. 1) and the second subassembly (e.g., the subassembly on the second side 110 of FIG. 1) are coupled together via the third subassembly when the structure is fully assembled. In some examples, the first subassembly and the second subassembly are physically assembled (e.g., by coupling components together to form a complete subassembly) in a similar method to the method 800. In other examples, the first subassembly and the second subassembly are assembled as a model (e.g., a computer-aided design (CAD) model, a scale model, etc.). Assembling the first subassembly and the second subassembly defines the nominal shape, nominal orientation, and nominal position of every component of the first subassembly and the second subassembly. The nominal positions of the first subassembly and the second subassembly will define how the third subassembly is later assembled.

The method 800 of FIG. 8 continues to block 806, where an example support component (e.g., the component 112 of FIG. 1) of the third assembly (e.g., the subassembly 104 of FIG. 1) is coupled to an example replicator (e.g., the replicator 106*a* of FIG. 3B) of an example replicator jig (e.g., the component replicator jig 100 of FIG. 1). The support component is a component that is coupled to at least one replicator jig to transfer assembly loads (e.g., a portion of a weight of the third assembly) to the replicator jig. The replicator (e.g., determinate, bracket, indexing feature, etc.) replicates (e.g., duplicates, mirrors, copies, etc.) an attachment location of the first subassembly. In this way, the component is positioned and oriented in the same manner as when the component is coupled to the first subassembly.

The method 800 of FIG. 8 continues to block 808, where the support component (e.g., the component 112 of FIG. 1) of the third assembly (e.g., the subassembly 104 of FIG. 1) is coupled to an example second replicator (e.g., the replicator 106*g* of FIG. 3D) of an example second replicator jig (e.g., the component replicator jig 102 of FIG. 1). The second replicator replicates an attachment location of the second subassembly. Additionally, the second replicator jig is disposed relative to the first replicator jig (e.g., the component replicator jig 102) such that the replicator (e.g., the replicator 106*a*) is disposed relative to the second replicator as the attachment point of the first subassembly is disposed relative to the attachment point of the second subassembly when the first subassembly and the second subassembly are in the completed structure. By coupling to the second replicator jig, the support component is evenly supported at both ends. In some examples, the support component is not coupled to the second replicator jig. In other examples, the support component is additionally coupled to an example third replicator jig. In some examples, the support component is coupled to the second replicator jig after other components are coupled to the replicator jigs and/or the support component. The example method 800 can change the order of assembling components, including assembling different components at approximately the same time, to best fit the manufacturing requirements and reduce total assembly time.

The method 800 of FIG. 8 continues to block 810, where it is determined if all support components have been coupled to a replicator jig. If not all support components have been coupled, the method 800 moves to block 806, where a second support component (e.g., the component 120 of FIG. 1) is coupled to an example third replicator (e.g., the replicator 106*c* of FIG. 3B) of the replicator jig (e.g., the component replicator jig 100 of FIG. 1). The third replicator replicates a second attachment location of the first subassembly. The third replicator is disposed relative to the replicator (e.g., the replicator 106*a* of FIG. 3B) as the second attachment location of the first subassembly is disposed relative to the attachment location of the first subassembly. The method 800 continues to block 808, where the second support component is coupled to an example fourth replicator (e.g., the replicator 106*e* of FIG. 3D) of the second replicator jig (e.g., the component replicator jig 102 of FIG. 1). The fourth replicator replicates a second attachment location of the second subassembly. The fourth replicator is disposed relative to the second replicator (e.g., the replicator 106*g* of FIG. 3D) as the second attachment location of the second subassembly is disposed relative to the attachment location of the second subassembly.

The method 800 continues to block 810, where it is determined if all support components have been coupled to a replicator jig. If all support components have been coupled, the method continues to block 812, where it is determined if all components have been coupled to the third subassembly (e.g., the subassembly 104 of FIG. 1). If not all components have been coupled to the third subassembly, the method 800 continues to block 814, where a component is coupled to another component. The method 800 repeats block 812 and 814 until all components have been added to the third subassembly. In some examples, a component (e.g., the component 116 of FIG. 1) is coupled to a support component (e.g., the component 112 of FIG. 1) at an example attachment location of the support component (e.g., the joining feature 134). In other examples, a component (e.g., the component 118 of FIG. 1) is coupled to a different component (e.g., the component 116 of FIG. 1) and, thus, is indirectly supported by the support component and the replicator jig. Returning to block 812, if all components have been coupled to the third subassembly, the method 800 moves to block 816.

At block 816 of the method 800 of FIG. 8, it is determined if all couplings within the third subassembly (e.g., the subassembly 104 of FIG. 1) have been completed. If not all couplings have been completed, the method 800 continues to block 818, where a component is coupled to another component. In some examples, a component (e.g., the component 114 of FIG. 1) is coupled to another component (e.g., the component 116 of FIG. 1) via a third component (e.g., the component 118 of FIG. 1). In other examples, a component (e.g., the component 116 of FIG. 1) that is coupled to a support component (e.g., the component 112 of FIG. 1) is additionally coupled to a second support component (e.g., the component 120 of FIG. 1). The support component includes a fastening feature (e.g., the joining feature 134 of FIG. 1) at an attachment location and the second support component includes a second fastening feature (e.g., the joining feature 136 of FIG. 1) at a second attachment location. The component includes a third fastening feature and a fourth fastening feature at opposite ends of the component. When the support component and the second support component are respectively coupled to the replicator (e.g., replicator 106*a* of FIG. 3B) and the second replicator (e.g., replicator 106*c* of FIG. 3B), the fastening feature of the support component is disposed relative to the second fastening feature of the second support component as the third fastening feature is disposed relative to the fourth fastening feature on the component. In other words, by coupling to the replicator jigs, all fastening features are aligned to allow components to couple to other components without adjusting components, reworking components, or adding fastening features (e.g., machining at assembly). After a component is coupled to another component, the method 800 returns to block 816 to determine if all couplings are completed. In this way, block 818 is repeated until all couplings within the third subassembly are completed.

Returning to block 816 of the method 800 of FIG. 8, if all couplings are completed, the method 800 moves to block 820. At block 820, the third subassembly (e.g., the subassembly 104 of FIG. 1) is decoupled from the assembly jig (e.g., the component replicator jig 100) and the second assembly jig (e.g., the component replicator jig 102). The method 800 continues to block 822, where the third subassembly is coupled to the first subassembly. The support components (e.g., the components 112,120 of FIG. 1) of the third subassembly are coupled to the corresponding attachment locations of the first subassembly that were replicated by the replicators (e.g., replicators 106*a*, 106*c* of FIG. 3B). The method 800 continues to block 824, where the third subassembly is coupled to the second subassembly. The support components (e.g., the components 112, 120 of FIG. 1) of the third subassembly are coupled to the corresponding attachment locations of the second subassembly that were replicated by the replicators (e.g., replicators 106*g*, 106*e* of FIG. 3B). In this way, all subassemblies have been coupled together to form the structure. In other examples, there may be a different number of subassemblies (e.g., two subassemblies, four subassemblies, ten subassemblies, etc.) that are assembled with replicator jigs and coupled together to form the structure.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

From the foregoing, it will be appreciated that example systems, apparatus, articles of manufacture, and methods have been disclosed that assist in assembling structures. Example systems, apparatus, articles of manufacture, and methods disclosed herein facilitate determinate assembly methods by ensuring configurations of subassemblies maintain nominal positions of joining members of the subassemblies. Components of a subassembly are positioned or indexed relative to the nominal positions of the joining members as the joining members of the subassembly are coupled to a jig that maintains the nominal positions. In this way, the joining members of the neighboring subassemblies are aligned despite each neighboring subassembly being manufactured separately. Example systems, apparatus, articles of manufacture, and methods disclosed herein reduce misalignment and tolerance stack ups within subassemblies by controlling the nominal positions of different sides of the subassembly. Example systems, apparatus, articles of manufacture, and methods disclosed herein facilitate serial production of subassemblies while maintaining consistency and precision of the key coupling features of the subassemblies. The component replicator jigs allow individual components of a subassembly to vary within defined tolerances while maintaining the nominal positions of the coupling features, thus reducing the risk of tolerance stack-up moving the coupling features outside of acceptable variation. Disclosed systems, apparatus, articles of manufacture, and methods are accordingly directed to one or more improvement(s) in the assembly of a structure, a machine, and/or mechanical device.

Example methods, apparatus, systems, and articles of manufacture for assembling structures are disclosed herein. Further examples and combinations thereof include the following:

Example 1 includes an apparatus including a plate with a datum feature and a bracket coupled to the plate. The bracket includes an indexing feature, the indexing feature positioned and oriented relative to the datum feature, the indexing feature to receive and orient a coupling member of an assembly, and a first coupling feature disposed on the indexing feature, the first coupling feature to align with a second coupling feature disposed on the coupling member of the assembly when the indexing feature receives the coupling member.

Example 2 includes the apparatus of example 1, wherein the bracket is removably coupled to the plate.

Example 3 includes the apparatus of example 2, wherein the bracket is removably coupled to the plate via fastener and a pin.

Example 4 includes the apparatus of any one of examples 1-3, wherein the bracket is a first bracket, the indexing feature is a first indexing feature, and the coupling member is a first coupling member, the apparatus further including a second bracket coupled to the plate spaced apart from the first bracket, the second bracket including a second indexing feature, the second indexing feature positioned and oriented relative to the datum feature, the second indexing feature to receive and orient a second coupling member of the assembly, and a third coupling feature disposed on the second indexing feature, the third coupling feature to align with a fourth coupling feature disposed on the second coupling member of the assembly when the first indexing feature receives the first coupling member and the second indexing feature receives the second coupling member.

Example 5 includes the apparatus of any one of examples 1-4, wherein the indexing feature includes a surface of the bracket.

Example 6 includes the apparatus of any one of examples 1-5, wherein the indexing feature includes the first coupling feature.

Example 7 includes the apparatus of any one of examples 1-6, wherein the indexing feature is a plurality of indexing features.

Example 8 includes a method for assembling a jig for determinate assembly, the method including coupling a first determinate to a plate, the plate including a reference feature, fixturing the plate into a machining center, setting a zero point of the machining center based on the reference feature, machining the first determinate to duplicate a first end of a first connecting member of a subassembly, and coupling the plate to a stand.

Example 9 includes the method of example 8, wherein coupling the first determinate includes coupling a second determinate to the plate, the second determinate different than the first determinate, and wherein machining the first determinate includes machining the second determinate, the second determinate to duplicate a second end of a second connecting member of the subassembly, the second determinate having a first orientation relative to the first determinate, the first orientation equivalent to a second orientation of the second end of the second connecting member relative to the first end of the first connecting member.

Example 10 includes the method of example 9, further including determining a shape of the first end of the first connecting member of the subassembly has been changed, decoupling the first determinate from the plate, coupling a third determinate to the plate, and machining the third determinate to duplicate the modified shape of the first end of the first connecting member, the third determinate having a third orientation relative to the second determinate, the third orientation equivalent to a fourth orientation of the modified first end of the first connecting member relative to the second end of the second connecting member.

Example 11 includes the method of any one of examples 8-10, wherein the stand is a first stand, the plate is a first plate, the reference feature is a first reference feature, and the subassembly is a first subassembly, the method further including coupling a fourth determinate to a second plate, the second plate including a second reference feature, fixturing the second plate into the machining center, setting the zero point of the machining center based on the second reference feature, machining the fourth determinate to duplicate a third end of a third connecting member of a second subassembly, and coupling the second plate to a second stand.

Example 12 includes the method of example 11, further including positioning the second plate opposite the first plate such that the first determinate has a fifth orientation relative to the fourth determinate, the fifth orientation equivalent to a sixth orientation of the first end of the first connecting member of the first subassembly relative to the third end of the third connecting member of the second subassembly when the first subassembly is coupled to the second subassembly via a third subassembly to form a final assembly.

Example 13 includes a method for assembling a structure, the method including assembling a first subassembly, the first subassembly including a first attachment location on a first side of the first subassembly, coupling a first component of a second subassembly to a first replicator of a jig, the first replicator to replicate the first attachment location, coupling a second component of the second subassembly to the first component at a second attachment location of the first component, and coupling the second subassembly to the first subassembly at the first attachment location.

Example 14 includes the method of example 13, further including coupling a third component to the first component.

Example 15 includes the method of example 14, further including coupling the third component to the second component.

Example 16 includes the method of any one of examples 13-15, wherein the first subassembly further includes a third attachment location on the first side of the first subassembly, and the jig includes a second replicator, the second replicator to replicate the third attachment location, the second replicator disposed relative to the first replicator as the third attachment location is disposed relative the first attachment location.

Example 17 includes the method of example 16, further including coupling a fourth component of the second subassembly to the second replicator.

Example 18 includes the method of example 17, further including coupling the second component to the fourth component at a fourth attachment location of the fourth component.

Example 19 includes the method of example 18, wherein the first component includes a first fastening feature at the second attachment location, the fourth component includes a second fastening feature at the fourth attachment location, and the second component includes a third fastening feature and a fourth fastening feature, the fourth fastening feature separate from the third fastening feature, the first fastening feature disposed relative to the second fastening feature as the third fastening feature is disposed relative to the fourth fastening feature when the first component is coupled to first replicator and the fourth component is coupled to the second replicator.

Example 20 includes the method of any one of examples 13-19, further including assembling a third subassembly, the third subassembly including a fifth attachment location on a first side of the third subassembly, coupling the first component of the second subassembly to a third replicator of a second jig, the third replicator to replicate the fifth attachment location, and coupling the third subassembly to the second subassembly at the fifth attachment location.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

a plate including a datum feature, the datum feature separate from openings in the plate that decrease a weight of the plate, an orientation of the datum feature indicative of an orientation of the plate; and a bracket coupled to a portion of the plate different than a portion of the plate that includes the datum feature, the bracket including:

an indexing feature, the indexing feature positioned and oriented relative to the datum feature, the indexing feature to receive a coupling member of an assembly; and a first coupling feature disposed on the indexing feature, the first coupling feature to align with a second coupling feature disposed on the coupling member of the assembly when the indexing feature receives the coupling member.

2. The apparatus of claim 1, wherein the bracket is removably coupled to the plate.

3. The apparatus of claim 2, wherein the bracket is removably coupled to the plate via a fastener and a pin.

4. The apparatus of claim 1, wherein the bracket is a first bracket, the indexing feature is a first indexing feature, and the coupling member is a first coupling member, the apparatus further including a second bracket coupled to the plate spaced apart from the first bracket, the second bracket including:

a second indexing feature, the second indexing feature positioned and oriented relative to the datum feature, the second indexing feature to receive and orient a second coupling member of the assembly; and a third coupling feature disposed on the second indexing feature, the third coupling feature to align with a fourth coupling feature disposed on the second coupling member of the assembly when the first indexing feature receives the first coupling member and the second indexing feature receives the second coupling member.

5. The apparatus of claim 1, wherein the indexing feature includes a surface of the bracket.

6. The apparatus of claim 1, wherein the indexing feature includes the first coupling feature.

7. The apparatus of claim 1, wherein the indexing feature is a plurality of indexing features.

8. The apparatus of claim 1, wherein the indexing feature includes a notch.

9. The apparatus of claim 1, wherein the datum feature is more proximate to an edge of the plate including the bracket than the openings.

10. An apparatus comprising:

a plate including a datum feature, the datum feature separate from openings in the plate, the openings to decrease a weight of the plate;

a bracket coupled to a portion of the plate different than a portion of the plate that includes the datum feature, the bracket including:

a flange to receive a coupling member of an assembly; and a first joining feature on the flange, the first joining feature to align with a second joining feature of the coupling member of the assembly when the flange receives the coupling member.

11. The apparatus of claim 10, wherein the bracket is removably coupled to the plate.

12. The apparatus of claim 11, wherein the bracket is removably coupled to the plate via a fastener and a pin.

13. The apparatus of claim 10, wherein the bracket is a first bracket, the flange is a first flange, and the coupling member is a first coupling member, the apparatus further including a second bracket coupled to the plate, the second bracket spaced apart from the first bracket, the second bracket including:

a second flange positioned and oriented relative to the datum feature, the second flange to receive and orient a second coupling member of the assembly; and a third joining feature on the second flange, the third joining feature to align with a fourth joining feature on the second coupling member of the assembly when the first flange receives the first coupling member and the second flange receives the second coupling member.

14. The apparatus of claim 10, wherein the flange includes a surface of the bracket.

15. The apparatus of claim 10, wherein the flange includes a notch.

16. A method comprising:

locating a datum feature on a plate, the datum feature separate from openings in the plate, the openings to decrease a weight of the plate, an orientation of the datum feature indicative of an orientation of the plate;

coupling a bracket to a portion of the plate different than a portion of the plate that includes the datum feature, the bracket including a flange and a first coupling feature on the flange;

receiving, at the flange, a coupling member of an assembly; and aligning the first coupling feature on the flange with a second coupling feature of the coupling member when the flange receives the coupling member.

17. The method of claim 16, wherein the coupling of the bracket to the plate includes removably coupling the bracket to the plate.

18. The method of claim 17, wherein the removably coupling of the bracket to the plate includes removably coupling the bracket to the plate via a fastener or a pin.

19. The method of claim 16, wherein the bracket is a first bracket, the flange is a first indexing feature, and the coupling member is a first coupling member, the method further including:

coupling a second bracket to the plate, the second bracket spaced apart from the first bracket;

receiving, at a second indexing feature of the second bracket, a second coupling member of the assembly; and aligning a third coupling feature on the second indexing feature with a fourth coupling feature of the second coupling member.

20. The method of claim 16, including placing a cable through a notch of the flange.

* * * * *